(12) United States Patent
Venditti et al.

(10) Patent No.: US 10,792,686 B2
(45) Date of Patent: Oct. 6, 2020

(54) HYDRO-CLEANING SYSTEM FOR A WC

(71) Applicant: Caesar srl, Carrara (IT)

(72) Inventors: Luisa Venditti, Arcola (IT); Fabio Giardino, Arcola (IT)

(73) Assignee: CAESAR SRL, Carrara (IT)

( * ) Notice: Subject to any disclaimer, the term of this patent is extended or adjusted under 35 U.S.C. 154(b) by 505 days.

(21) Appl. No.: 15/574,772

(22) PCT Filed: May 30, 2016

(86) PCT No.: PCT/IB2016/053169
§ 371 (c)(1),
(2) Date: Nov. 16, 2017

(87) PCT Pub. No.: WO2016/193893
PCT Pub. Date: Dec. 8, 2016

(65) Prior Publication Data
US 2018/0141067 A1    May 24, 2018

(30) Foreign Application Priority Data

Jun. 1, 2015 (IT) .................. 102015000019699

(51) Int. Cl.
| | |
|---|---|
| *B05B 11/00* | (2006.01) |
| *A47K 11/10* | (2006.01) |
| *B05B 9/047* | (2006.01) |
| *B05B 9/043* | (2006.01) |
| *G01F 11/02* | (2006.01) |
| *B05B 11/04* | (2006.01) |
| *B05B 9/04* | (2006.01) |
| *B05B 17/04* | (2006.01) |

(52) U.S. Cl.
CPC .......... *B05B 11/3095* (2013.01); *A47K 11/10* (2013.01); *B05B 9/043* (2013.01); *B05B 9/047* (2013.01); *B05B 11/0056* (2013.01); *B05B 11/045* (2013.01); *B05B 11/3015* (2013.01); *G01F 11/027* (2013.01); *B05B 9/04* (2013.01); *B05B 17/04* (2013.01)

(58) Field of Classification Search
None
See application file for complete search history.

(56) References Cited

U.S. PATENT DOCUMENTS 1,999,655 A   4/1935   Coyle
2,678,006 A   5/1954   Gray

FOREIGN PATENT DOCUMENTS

BE   519 113 A   4/1953
CH   98 959 A    5/1923

OTHER PUBLICATIONS

International Search Report and Written Opinion issued in PCT/IB2016/053169 dated Sep. 29, 2016.

*Primary Examiner* — Rita P Adhlakha
(74) *Attorney, Agent, or Firm* — Arent Fox LLP

(57) ABSTRACT

A hydro-cleaning manual system, in particular apt to the cleaning of a WC, comprising a liquid jet device and a supporting/reservoir device.

16 Claims, 9 Drawing Sheets

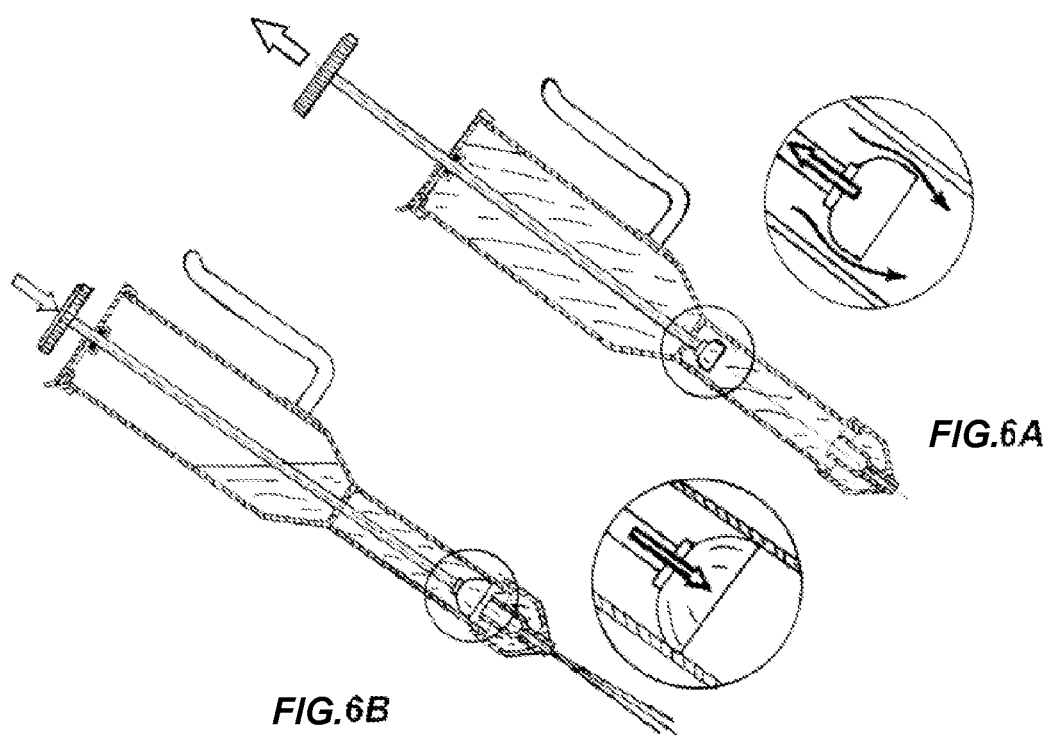
FIG.6A
FIG.6B
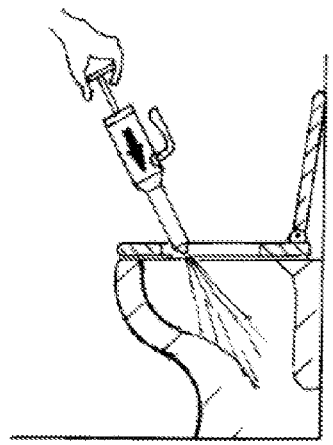
FIG. 7
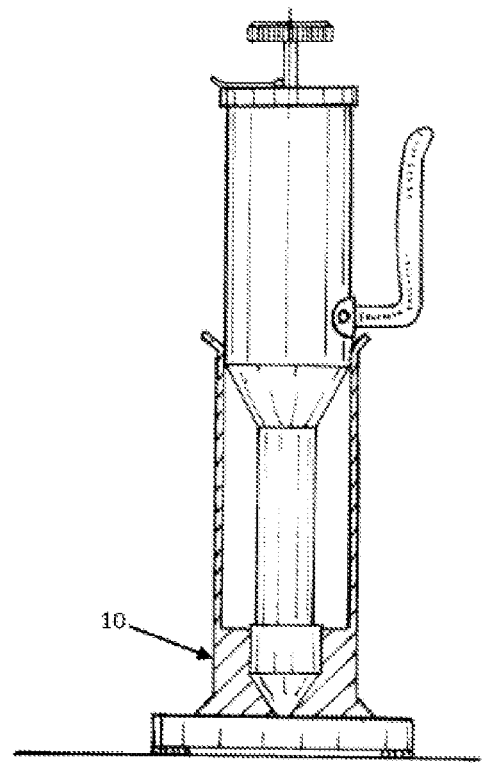
FIG. 8

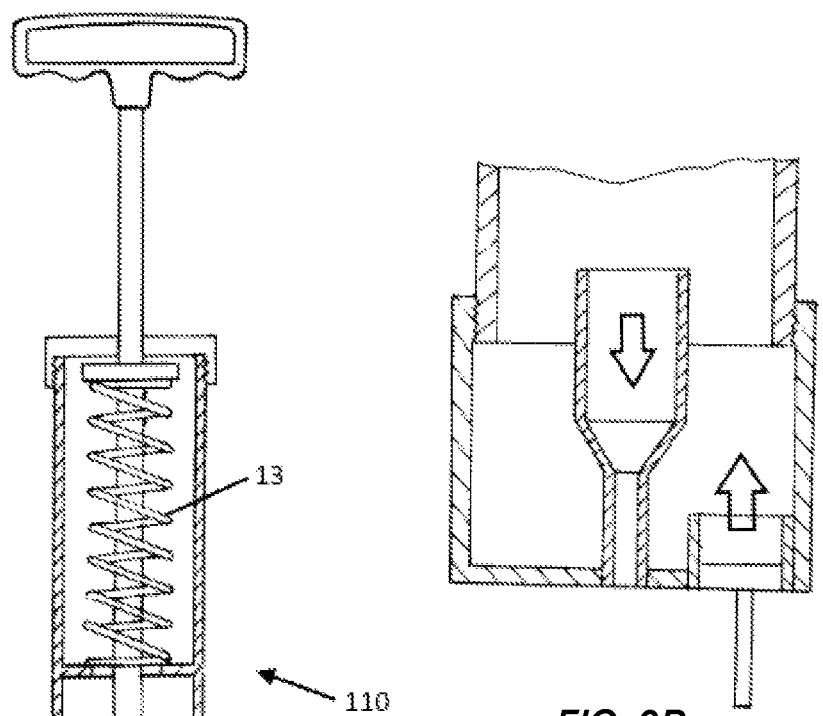
FIG. 9B
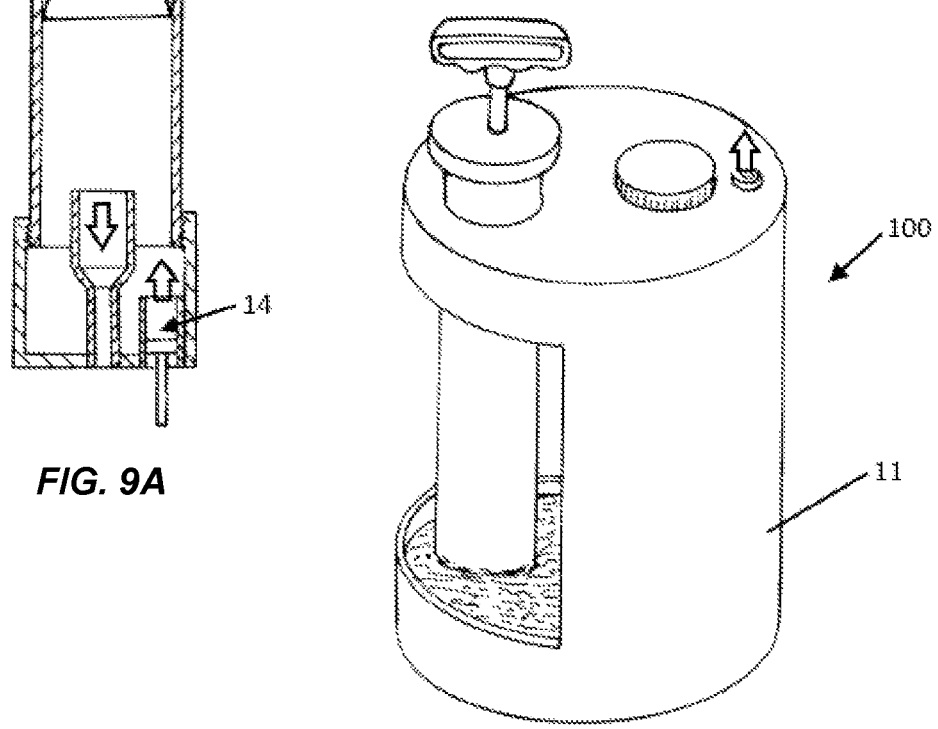
FIG. 9A
FIG. 10

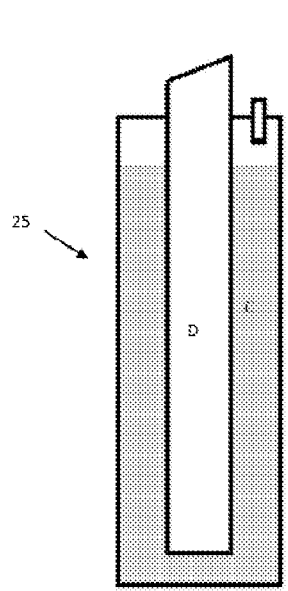
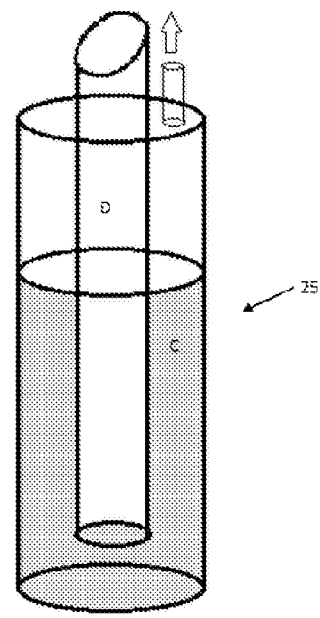
FIG.14　　　　　　FIG.15
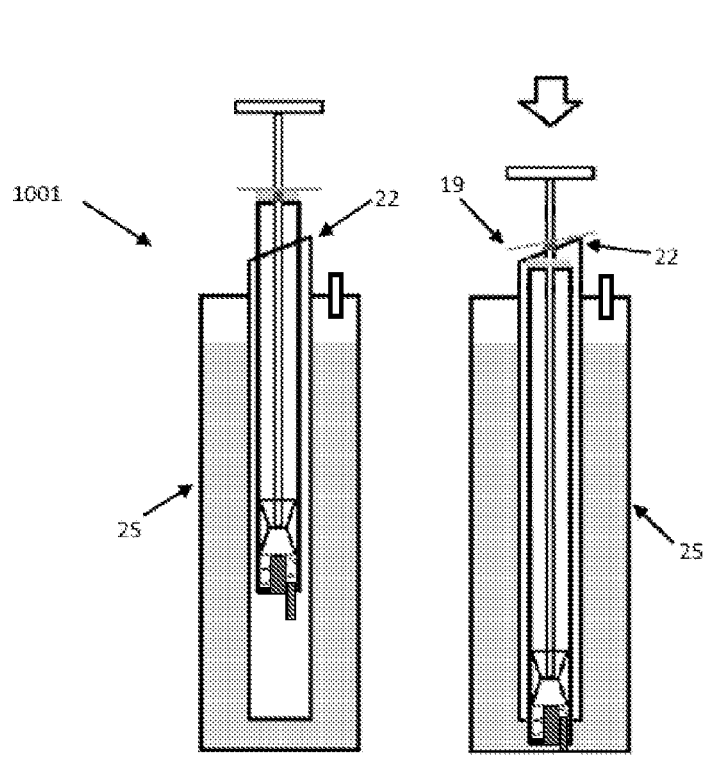
FIG.16　　　FIG.17　　　FIG.18

HYDRO-CLEANING SYSTEM FOR A WC

CROSS-REFERENCE TO RELATED APPLICATIONS

This application is a National Stage entry of International Application No.: PCT/IB2016/053169, filed May 30, 2016, which claims priority to Italian Patent Application No. 102015000019699, filed Jun. 1, 2015. The disclosure of the priority applications are hereby incorporated in their entirety by reference.

DESCRIPTION

Technical Field of the Invention

The present invention relates to a hydro-cleaning system, in particular apt to the cleaning of a WC.

Background

The toilet cleaning is a problem affecting everyone indiscriminately. The WC par excellence is the sanitary bathroom element which mostly gets dirty and requires frequent cleaning procedures to keep a high hygiene level. The problem is much felt, in fact the known art is full of technical solutions which try to solve it. In particular, the universally widespread solution for cleaning the sanitary toilet, at home, is the traditional brush.

This object, existing without doubt in all houses in the world, has an end equipped with cracks for scraping the WC inner surface, in order to detach dirt and incrustations. Advantageously, during this procedure often dirt is transferred from the toilet wall to the brush itself, by remaining trapped between the cracks. The brush, then, becomes the object to be cleaned, an object bearing germs and dirtiness. Notwithstanding the poor hygiene level, the brush generally is put back, when not used, in brush-holder which is positioned on the floor near the WC, and it can be reached by everyone. Inside the brush-holder, the proliferation of bacteria and dirty accumulation is almost unavoidable. Furthermore, it could be easy for a child to come in contact with a so dirty object.

In the light of these uncomfortable and not hygienic drawbacks, the idea of providing an alternative to the toilet cleaning by means of a brush was the subject of many speculations, as it is demonstrated by the several inventions existing in the known art.

In particular, it can be noted that the most developed idea is the one of cleaning the WC by means of water jets, origin of the most various, both manual and automatic technical solutions.

For example, a technical solution providing the use of a jet device is described in the patents BE 519 113 A and U.S. Pat. No. 2,678,006.

However, such solutions are mostly implemented by means of complex, expensive and cumbersome devices requiring installation by qualified hydraulic technicians. Furthermore, such devices have to be in some way connected to the household water system, thus by involving not negligible costs and troubles.

In fact, such solutions substantially have not become widespread and the cleaning of the sanitary toilet generally continues to be implemented by means of using the brush, with all disadvantages deriving therefrom.

SUMMARY OF THE INVENTION

The technical problem placed and solved by the present invention is then to provide a hydro-cleaning system, in particular apt to the cleaning of a WC, allowing to obviate the drawbacks mentioned above with reference to the known art.

Such problem is solved by a hydro-cleaning system according to claim 1.

Preferred features of the present invention are subject of the depending claims.

The present invention provides some relevant advantages. The main advantage consists in the fact that the hydro-cleaning system according to the present invention results to be wholly safe from the hygienic point of view, since no portion of the device finds in contact with the WC inner portion. Said system further has a minimum encumbrance and it is very easy to handle, it does not need any installation or connection to the water network. Furthermore, the hydro-cleaning system according to the present invention is easy to be used and it has a low cost.

According to an additional advantageous aspect, a particular embodiment of the invention further allows to solve the problem linked to the bad smell of the WCs after the use thereof.

Other advantages, features and use modes of the present invention will result evident from the following detailed description of some embodiments, shown by way of example and not for limitative purpose.

BRIEF DESCRIPTION OF THE FIGURES

The figures of the enclosed drawings will be referred to, wherein:

FIG. 6A shows a phase for loading the jet device according to the present invention;

FIG. 6B shows a phase for using the jet device according to the present invention;

FIG. 7 shows a mode for applying the jet device in the use phase;

FIG. 8 shows an embodiment of a hydro-cleaning system according to the present invention;

FIG. 9A shows a longitudinal section view of an additional embodiment of the jet device according to the present invention;

FIG. 9B shows a detail of FIG. 9A;

FIG. 10 shows another embodiment of a hydro-cleaning system according to the present invention;

FIGS. 14 and 15 show a section and a perspective view, respectively, of a variant of an additional embodiment of a hydro-cleaning system according to the present invention;

FIGS. 16, 17 and 18 show in sequence the modes for re-loading the hydro-cleaning system of FIG. 15;

The thicknesses and bending represented in the figures illustrated above are to be meant as a pure example, they generally are magnified and not necessarily shown in proportion.

DETAILED DESCRIPTION OF PREFERRED EMBODIMENTS

Hereinafter, various embodiments and variants of the invention will be described, and this with reference to the above-mentioned figures.

Analogous components are designated in the different figures with the same numeral reference.

In the following detailed description, additional embodiments and variants with respect to embodiments and variants already treated in the same description will be illustrated limited to the differences with respect to what already illustrated.

Furthermore, the different embodiments and variants described hereinafter are subjected to be used in combination, where compatible.

Figure 1:
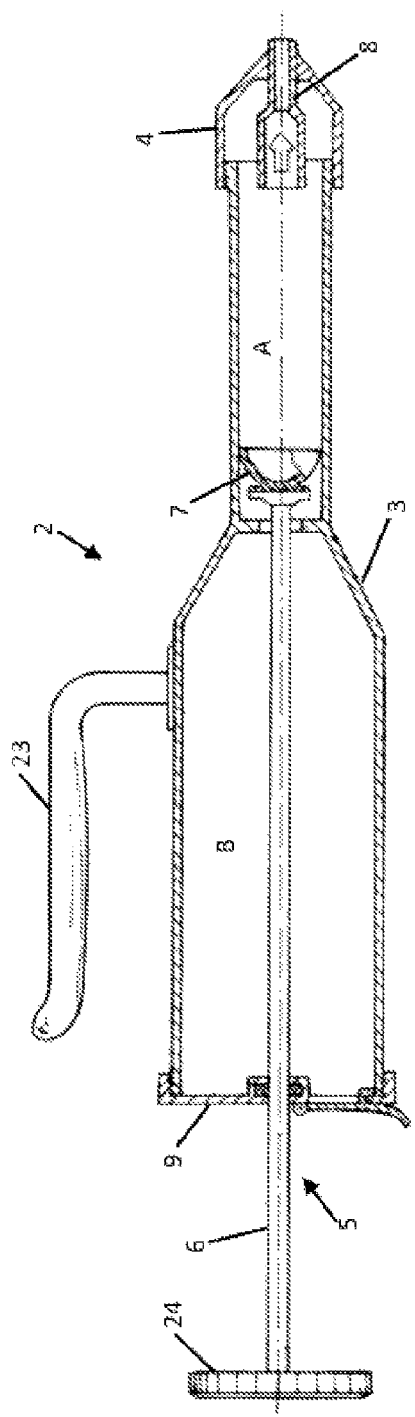
FIG. 1 shows a longitudinal section view of a first embodiment of a jet device according to the present invention.

By firstly referring to FIG. 1, a first embodiment of a jet device according to the present invention is designated as a whole with 2.

Said jet device 2 comprises at least: a cylindrical body 3, a piston 5 associated to said cylindrical body 3, and a nozzle 4 for the liquid emission, thereto a first unidirectional valve 8 is associated.

The cylindrical body 3 is hollow, in particular suitable to contain a sanitizing fluid, preferably in liquid form, which can be simply water, or water additioned to other preferably sanitizing substances, for example a detergent or disinfectant. Said cylindrical body 3 has a longitudinal development axis L and it is configured for the removable connection to the nozzle 4 at a first terminal end thereof. At a second terminal end of said cylindrical body 3 the presence of a closing element or bottom 9 can be preferably provided, apt to prevent the emission of the liquid contained inside the cylindrical body 3 itself. Said bottom 9 is preferably connected or connectable removably to the cylindrical body 3, in this way by allowing to be able to exploit advantageously the second terminal end thereof for inserting the liquid.

Figure 3:
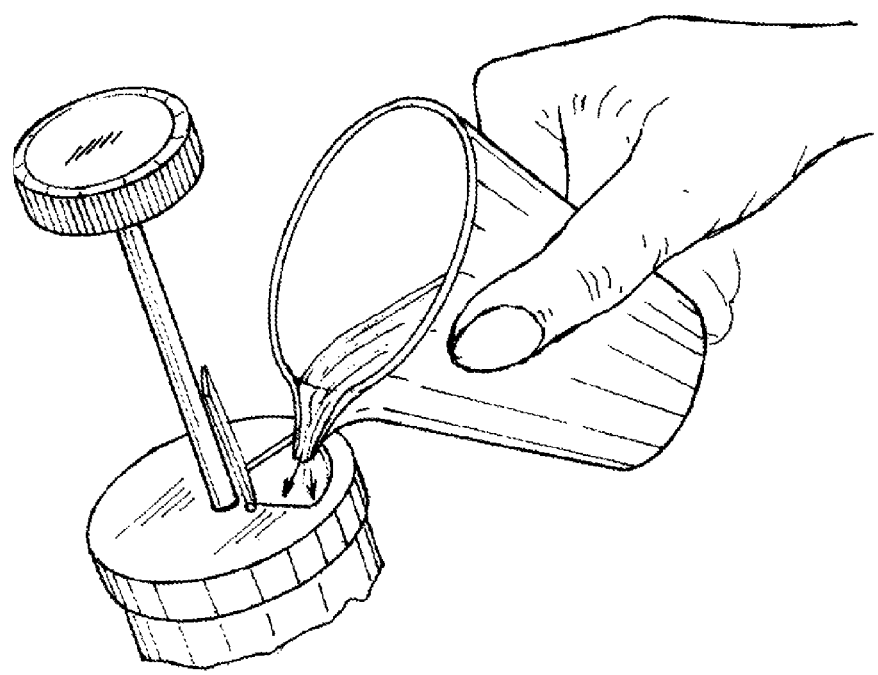
FIG. 3 shows a mode for filling the jet device according to the present invention.

Alternatively, it is possible that in such bottom 9 at least an opening section is provided, preferably equipped with an openable plug, apt to allow the insertion of said liquid in the hollow cylindrical body 3, as shown in FIG. 3.

Furthermore, said bottom 9 has a hole equipped with guiding and sealing elements, apt to allow a sliding of the driving rod 6 and prevent the liquid from outgoing from the hollow cylindrical body 3.

Figure 2:
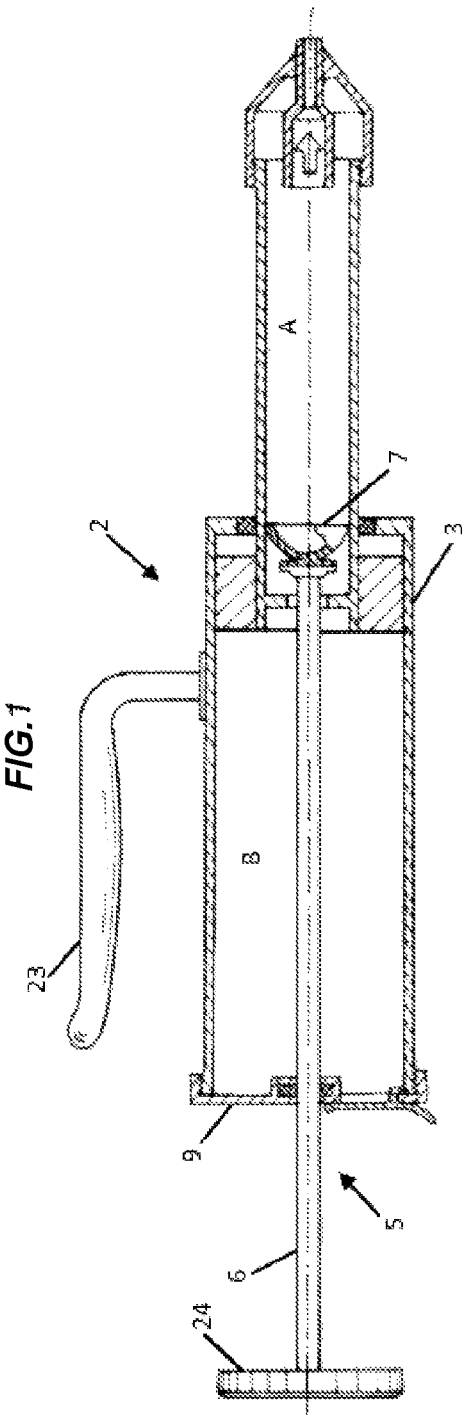
FIG. 2 shows a longitudinal section view of another embodiment of the jet device according to the present invention.

The cylindrical body 3, according to another embodiment of the invention, can comprise at least two hollow cylindrical portions, in telescopic relation therebetween, as shown in FIG. 2.

Such hollow portions have different area sections and they are slidingly connected by means of guides to the translation, in particular a portion with smaller section can slide inside a portion with larger section. The invention device according to this particular embodiment has then a variable encumbrance. In particular, in a non-use configuration so that the telescopic portions are inserted one into the other one, it can result to be sensibly more compact than the first embodiment; in a use configuration wherein the telescopic portions are wholly extended, the encumbrance is similar to that of the first embodiment, the overall dimensions of the device being equal. This configuration can result to be advantageous in case of transportation of the device or when the space available for the preservation thereof is limited.

Said jet device 2 preferably can have at least a grip member 23, connected to the cylindrical body 3, to improve the manageability and the comfort of the device upon use.

At last, in particular, said cylindrical body 3 can have, alternatively to a substantially circular section, a section of elliptical type or with any other geometrical shape allowing an effective sliding of the piston 5 inside thereof, that is so that the functional object of the device is implemented, which will be described better hereinafter in the description.

The piston 5, moved by an alternated translational motion, is associated to said cylindrical body 3. Said piston 5 comprises a driving rod 6 and a plunger 7.

Said driving rod 6 can have, at one first end thereof, a driving handle 24 configured to be grasped firmly, but at the same time having an ergonomic shape. In fact, it will be appreciated hereinafter that said device has a manual operation.

The rod 6 is apt to slide according to an alternated translation motion, respectively between a position of maximum extraction of the piston 5 from said cylindrical body 3, represented in FIG. 6A, and a position of maximum penetration of the piston 5 in said cylindrical body 3 itself, shown in FIG. 6B. At a second end of the rod 6 there is the plunger 7, mainly apt to compress the liquid to perform the hydro-cleaning procedure.

The position of maximum extraction of the piston 5 from cylindrical body 3 is determined by the presence of a stopper for the piston 5, for example implemented as a shrinkage localized in the passage section of the cylindrical body 3. This restricted passage section has a lower area than that of the plunger 7, which stops in abutment thereon.

Said plunger 7 has a geometry complementary to the cylinder cavity, as it will be better explained hereinafter. The plunger 7 can be moved by a translatory motion approaching or moving away from said first terminal end of said hollow cylindrical body 3, said approaching movement being associated to a phase of emitting liquid from said nozzle 4. Moreover, the plunger 7 limits a first chamber A and a second chamber B of said hollow cylindrical body 3, at said first and second terminal end thereof, respectively, as shown in FIG. 1. Said chambers have then a volume variable depending upon the position of the plunger 7 itself.

Said plunger 7 preferably comprises at least a portion made of elastically deformable material, and it is shaped preferably like a spherical cap, but it can be alternatively made with different geometries, for example like a disc.

Figure 5A:
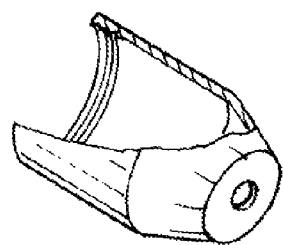
FIGS. 5A, 5B and 5C show different embodiments of a nozzle of the jet device according to the present invention, respectively.
Figure 5B:
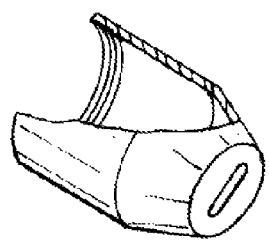
Figure 5C:
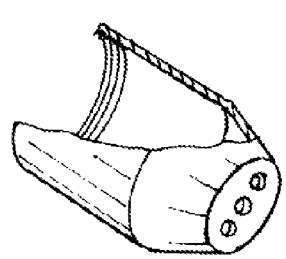

The nozzle 4 is removably connected at the first terminal end of the cylindrical body 3. Said nozzle 4 is equipped with one or more holes therethrough the liquid emission is to be implemented, which liquid will be emitted from the device at a front terminal portion of the nozzle 4 in the shape of one or more jets under pressure, said pressure depending from the diameter and the number of the holes themselves. In particular, upon decreasing the area of the passage section of a hole, the jet pressure increases. As it is shown by way of example and not for limitative purpose in FIGS. 5A, 5B and 5C, different embodiments of the nozzle 4 according to the present invention provide the presence of a circular hole, or three circular holes, or a substantially elliptical and much elongated hole, respectively, for implementing a wider jet. All embodiments including nozzles equipped with holes characterized by any type of geometry are to be considered within the protective scope of the following invention.

In a particular embodiment of the device according to the present invention, a connection of the nozzle 4 to the cylindrical body 3, implemented by means of a threaded connection, can be provided.

Figure 4:
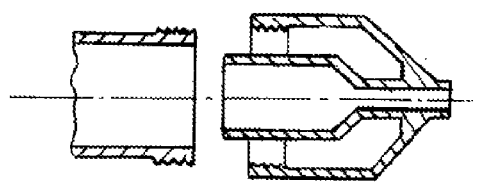
FIG. 4 shows an exploded view of a detail of the jet device of FIG. 1 or 2.

Said nozzle 4 preferably receives inside thereof, as said previously, the first unidirectional valve of the flow 8, which can be for example a non-return or a retaining valve, shown in the detail of FIG. 4.

Hereinafter in the description, under the term unidirectional valve a retaining or non-return valve is meant. Said valve is removably connected or connectible to the nozzle 4, preferably inserted inside thereof, so that the outgoing liquid flow passes compulsorily therethrough, and it is usually closed. Such first unidirectional valve 8 is inserted with an orientation so as to allow the liquid flow only outgoing from the jet device 2, and not the contrary. Another function of said first vale 8 is to avoid the dripping of the jet device 2 after a use phase. Such drawback is avoided as the first first unidirectional valve 8 usually is closed.

The operation modes of the jet device 2 in the sofar described embodiments are the following ones.

Let's consider a starting configuration so that the piston 5 is in the position of maximum penetration into the cylindrical body 3 and inside the cylindrical body 3 there is no liquid. In this configuration, the chamber B has the maximum volume and the chamber A has the minimum volume. First of all, the insertion of the liquid into the hollow cylindrical body 3 is performed. As said previously, said liquid can be inserted through the second terminal end of the cylindrical body 3, after removal of the bottom 9, or through the possible opening section, equipped with an openable plug, arranged on the bottom 9 itself. Said liquid fills up the chamber B of the cylindrical body 3, in particular as far as the plunger 7. At this point, a driving handle 24 is engaged and an extraction force is exerted on the piston 5, by causing a translation motion of the same piston 5 towards the position of maximum extraction from the cylinder. During such motion, the elastically deformable portion of the plunger 7 is subjected to a deformation so that it does not adhere completely to the inner cavity of the cylinder. At this motion, the plunger 7 lets the liquid to flow along the walls of the cylindrical body 3 exclusively from the chamber B to the chamber A, as shown in detail in FIG. 6A. Meanwhile, said chamber A increases the volume thereof, to the detriment of the volume of the chamber B, while it fills-in with liquid. When the plunger 7 stops at the stopper, the piston 5 is in a position of maximum extraction from the cylinder, the chamber A has the maximum volume and it is wholly filled-in with liquid. At this point, a push on the driving handle 24 is exerted to invert the motion of the piston 5. Said piston 5 then starts a motion of approaching towards the first terminal end of the cylinder. At this motion direction, the elastically deformable plunger 7 adheres to the walls of the hollow cylindrical body 3, and it does not allow any more a liquid flow between the two chambers, as shown in details in FIG. 6B. The plunger 7 implements a compression on the liquid contained inside the chamber A, which is then obliged to flow in the first unidirectional valve 8. The latter unidirectional valve 8 opens due to the pressure of the liquid itself, which outgoes from the jet device 2 through the single existing opening(s), that is the hole(s) of the nozzle 4. The liquid is emitted under the form of high pressure jet, apt to implement a cleaning procedure, for example of the inner surface of a sanitary toilet, as shown in FIG. 7.

The hydro-cleaning system 1 as described above can further include a supporting device 10, wherein the jet device 2 is to be placed when not in use, which for example can be positioned near the sanitary toilet. In particular, said supporting device 10 can be configured to implement a housing for said first terminal end of said jet device 2, as shown in FIG. 8. This particular embodiment of the supporting device 10 allows preserving the jet device 2 in a configuration so that it results to be comfortable, for the user, to grasp it when there is the use need.

An additional embodiment of the jet device 110 according to the present invention is represented in FIG. 9A.

In this additional embodiment, the jet device 110 comprises a return elastic member 13 and a second, usually closed, unidirectional valve 14.

Said return elastic member 13 is interposed between said hollow cylindrical body 3 and said piston 5, and it is apt to draw the piston 5 back in a position of maximum distance from said first terminal end. For example, in a possible embodiment, such elastic element can be implemented by means of one or more bands made of elastic material, fastened at the ends thereof respectively to the cylindrical body 3, at the second terminal end, and to the piston 5.

As shown in FIG. 9A, the return elastic member 13 preferably can be implemented by means of a helical spring. Such spring 13 can have a first end fastened to a surface of said hollow cylindrical body 3, for example implemented by means of the localized shrinking of the passage section acting even as stopper for the piston 5. The return spring 13 can further have a second end fastened to an acknowledgment surface of said piston 5, for example implemented by means of a localized growth of the section of the driving rod 6. The so described return spring 13 indeed is apt to draw the piston 5 back in a position near the second terminal end of said hollow cylindrical body 3 when it is in a rest configuration. When the user exerts a push on the piston 5 to produce the outgoing of the water jet, he/she has to win the elastic contrast force of the spring 13, which pulls the piston 5 in the opposite direction.

Alternatively, the return elastic member 13 can be implemented by means of an elastic body or any spring apt to work under traction or compression.

As said previously, this additional embodiment of the jet device 110 additionally comprises the second unidirectional valve 14. Said second unidirectional valve 14 is removably connected or connectable to said hollow cylindrical body 3 at said first terminal end, oriented so as to allow the inlet of said liquid in said first chamber A and prevent the outgoing of the liquid from hollow cylindrical body 3.

The presence of the second unidirectional valve 14 allows implementing, in this additional embodiment of the jet device 110 according to the present invention, a different mode for filling-in the device with respect to that of the above-described embodiments.

In particular, the filling-in of the jet device 110 can take place by means of the fluid inlet through the second unidirectional valve 14. The latter preferably comprises an element 30 comparable to a piston, as shown by way of example in FIG. 9B, to implement an actuation of mechanical type. When the valve is closed and it does not allow the passage of liquid (as in the configuration of FIG. 9B, the rod 30 of said element comparable to a piston results to be in position of maximum extraction with respect to the valve itself, by projecting outside the jet device 110.

After a phase of using the jet device 110, the piston 5 is in a position of maximum penetration inside the hollow cylindrical body 3. Thanks to the fact that the first unidirectional valve 8 existing in the nozzle 4 does not allow the inlet of the liquid or of the air itself inside the jet device 110, and that the second unidirectional valve 14 allows the inlet of liquid (or air) in the jet device 110 only if mechanically actuated, the piston 5 remains in this position, notwithstanding the return force exerted by the spring 13.

In fact, inside the first chamber A of the hollow cylindrical body 3 a very low pressure with respect to the outer one, or substantially the vacuum, can be implemented, then the piston 5 remains still in the position of maximum penetration inside the cylindrical body 3.

In this situation, it is necessary to re-load the jet device 110 with the liquid, in order to proceed again with the use thereof. To perform the filling-in of the device it is possible simply to dip it, at the first terminal end thereof, in a reservoir containing liquid, so that said first terminal end of the jet device 110 is in contact with the bottom of the reservoir itself. The approaching of the first terminal end of the device to the reservoir bottom causes a push and then a sliding of the plunger 30 of said second unidirectional valve 14, in particular it penetrates inside the valve as far as implementing an opening of the passage section of the valve itself. The second unidirectional valve 14 is then open, therefore the fluid is allowed to cross it according to an inlet direction inside the jet device 110. It is sufficient that said second unidirectional valve 14 is open to draw the liquid back inside thanks to the motion of the piston 5 which, pushed by the return spring 13, can now translate according to a direction of extracting from the jet device 110. Whereas the liquid enters, the cylinder piston 5 continues the motion thereof as far as reaching the position of maximum extraction with respect to the hollow cylindrical body 3. In this way, the filling-in of the device is implemented, which is ready to be used again.

In order to perform an easier filling-in of the device, another embodiment of a supporting device 10 according to the present invention can be provided, in particular comprising a liquid reservoir. The new embodiment of the hydro-cleaning system 100 according to the present invention is shown in FIG. 10.

Figure 11:
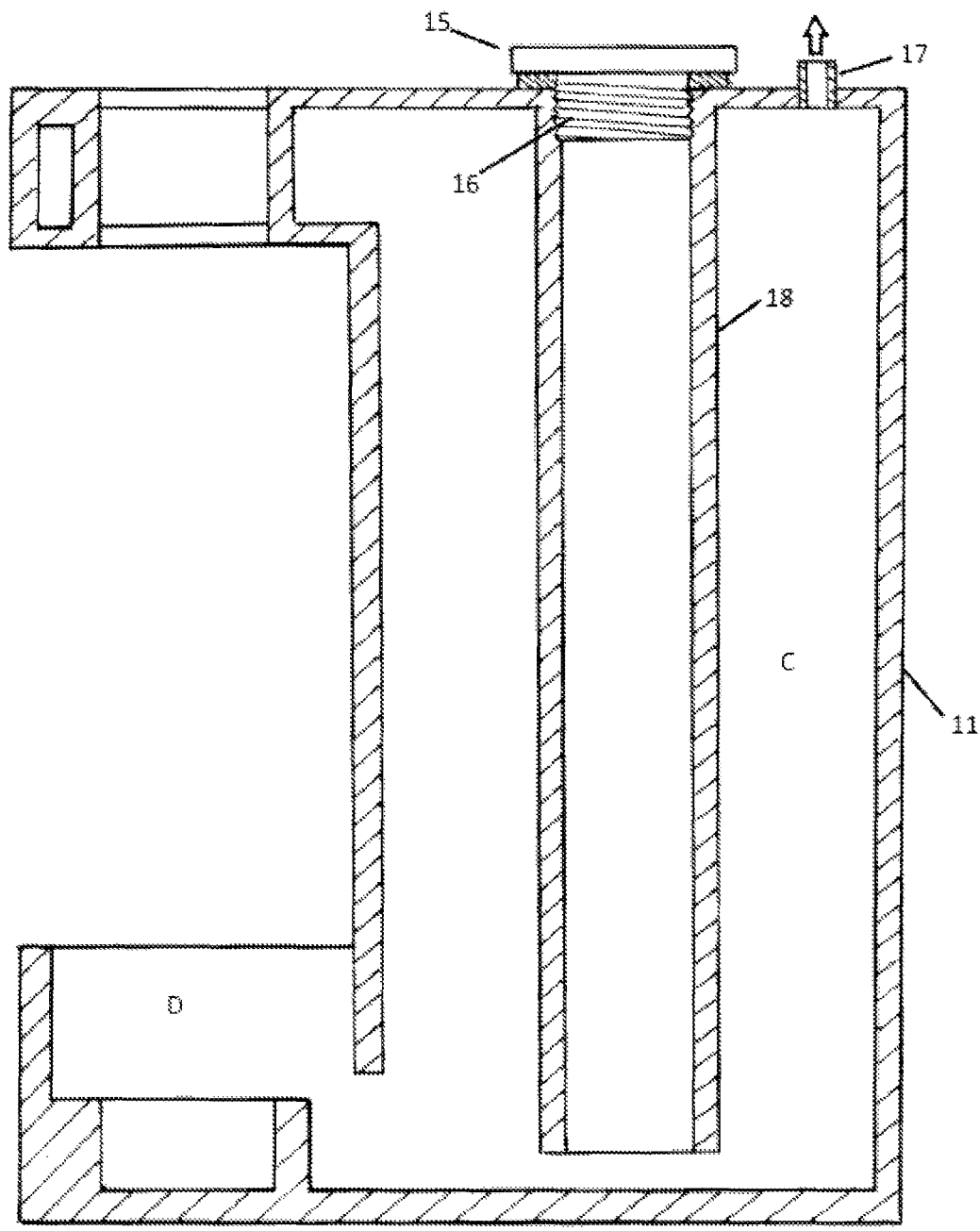
FIG. 11 shows a longitudinal section view of an embodiment of a supporting device according to the present invention.

In said new embodiment of the hydro-cleaning system 100, the supporting device 11 comprises a liquid reservoir implemented by applying the theory underlying the common drinking bowls for animals. This embodiment of the supporting/reservoir device 11 is shown in FIG. 11.

The supporting device 11 is configured so as to include a sanitizing liquid reservoir.

The reservoir comprises a first space C and a second space D having a common bottom, being communicating at said common bottom by a passage, apt to guarantee the liquid passage from the first chamber C to the second chamber D. The latter second chamber D has an opening opposite to said common bottom and said first space C has a closing element opposite to said common bottom. Furthermore said first space C, preferably at the closing element, comprises a filling opening 15 for inserting the liquid, equipped with a third unidirectional valve 16 usually closed to guarantee the sealing of the first chamber C of the reservoir during the filling-in and a fourth, usually closed, unidirectional valve 17, oriented so as to let the air to outgo from inside of said reservoir towards outside. Said air outgoing implements during the filling-in of the reservoir, when the liquid pushes the air included in the reservoir itself towards outside, through the above-mentioned fourth unidirectional valve 17, and it occupies the volume freed by the air itself. About the filling opening 15, it configured so as to allow the connection thereof to means for sealingly filling-in said reservoir. Furthermore, at said opening, a tubular element 18 preferably can be engaged removably, extending from said opening as far as near the bottom of said reservoir.

The second chamber D, at the bottom, preferably comprises a portion apt to implement a housing for the first terminal end of the jet device 110, arranged for keeping such device in preferably vertical position (as shown in FIG. 10).

The present supporting/reservoir device 11 is filled-in with liquid through said filling opening 15 and said liquid flows from the first chamber C to the second chamber D through the communication passage between the two chambers. Said second space D, as said previously, has an opening opposite to the common bottom, then the level reached by the free surface of the liquid in the second chamber D substantially depends upon the atmospheric pressure outside the reservoir and upon the weight of the liquid itself.

When the jet device 110, after use, is housed in the supporting device 11, the filling-in thereof is implemented automatically by means of the mechanical opening of the second unidirectional valve 14, according to the mode described previously. When it is necessary to re-integrate the liquid included in the supporting/reservoir device 11, a conduit, a tank or in general means for feeding the liquid is engaged or connected to the above-mentioned supporting device 11, at the filling-in opening 15, descending along the tube 18 and it is thus so transferred inside the supporting/reservoir device 11 itself.

Generally, the system of the invention can have even a reversible locking mechanism 66 of the piston 5 with respect to the cylindrical body 3, which can be for example of mechanical or magnetic type. Furthermore, a corresponding system 68 for releasing the reversible locking mechanism 66 can be provided, preferably a releasing system of mechanical type.

In particular, a magnetic locking system 67 of the piston 5 with respect to the cylindrical body 3 can be provided.

Generally, the magnetic locking system 67 can comprise one or more magnets 21 placed near the bottom 9 and a corresponding attraction member 19, positioned at a first end of said rod 6 opposite to the plunger 7, apt to be attracted by magnets. To this purpose, the attraction member 19 can be made of ferromagnetic material, or it can comprise magnets. Of course, it is possible to invert the positioning of the just mentioned elements.

Figures 12A, 12B, 13:
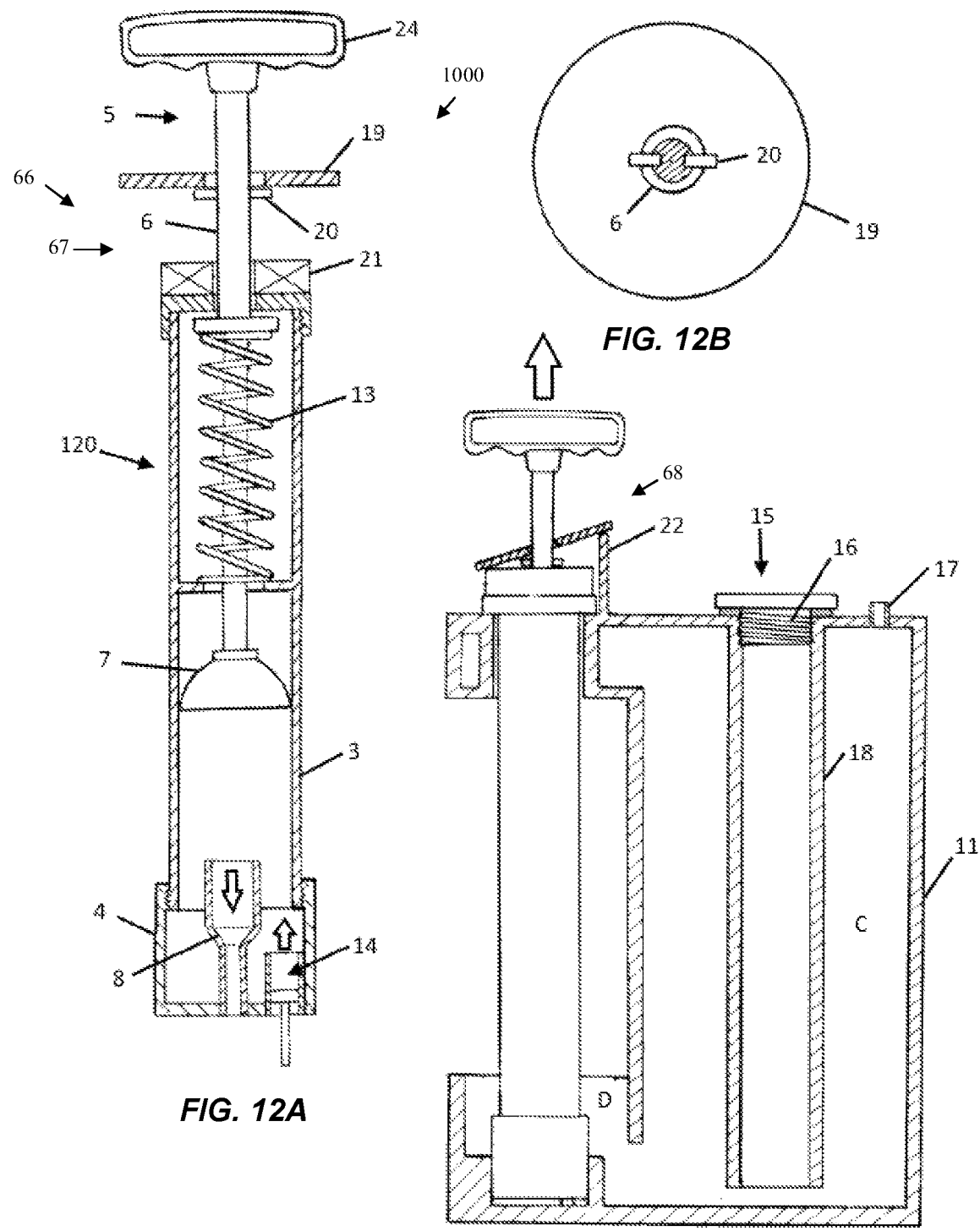
FIG. 12A shows a longitudinal section view of a more complex embodiment of a jet device according to the present invention.
FIG. 12B shows a cross section view of the embodiment of FIG. 12B.
FIG. 13 shows a section view of an additional embodiment of a hydro-cleaning system according to the present invention.
Figure 22:
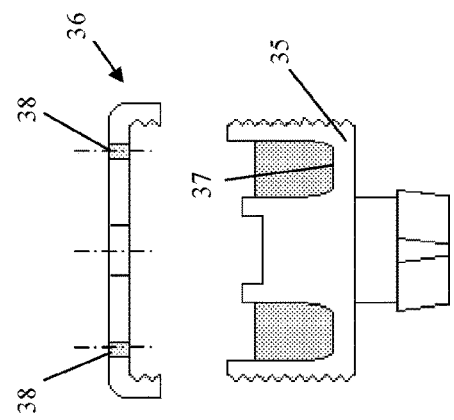
FIG. 22 shows a section view of a perfume reservoir member and a corresponding covering element.
Figure 21:
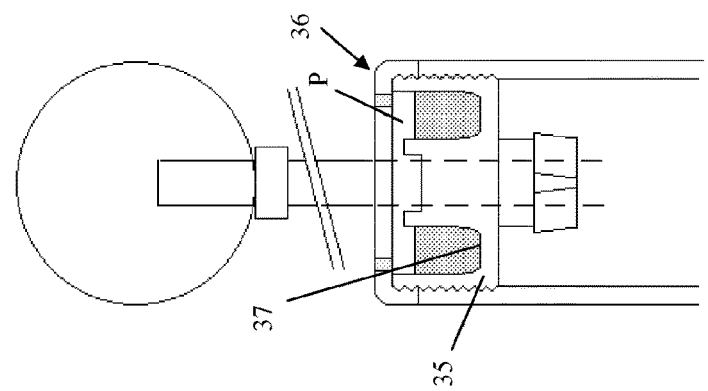
FIG. 21 shows a section partial view of the device of FIG. 19.
Figure 20:
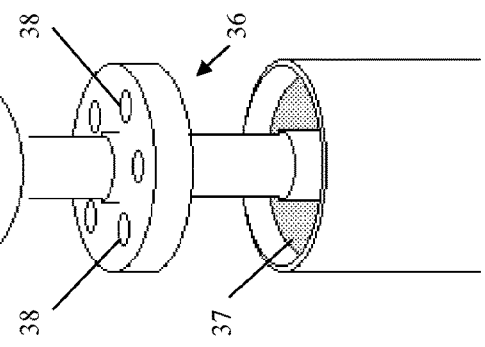
FIG. 20 shows an exploded partial perspective view of the device of FIG. 19.

An embodiment of a jet device 120 according to the present invention according to the just described operation is shown in FIG. 12A, wherein the preferred embodiment of the system of the invention is designated with 1000.

The device 120 comprises a magnetic locking system 67 and a corresponding releasing system 68. By referring to FIG. 12A, on the driving rod 6 of the piston 5 the attraction member 19 can be inserted or engaged, positioned at a first end of said rod 6 opposite to the plunger 7.

The attraction member 19 can be fix or mobile, in the present embodiment it is implemented by means of a mobile element preferably shaped like a disk, apt to translate along a portion of the rod 6 itself. Said disk 19 preferably is made of ferromagnetic material or however a material apt to be attracted by a magnet, for example it can be implemented by means of an iron washer or by means of an additional magnet. Furthermore, the disk 19 preferably has a larger radial encumbrance surface than that of the cylindrical body 3, that is of the jet device itself. Still, according to a preferred embodiment of the releasing system 68, the rod 6 can comprise a stopper element 20 for said mobile element 19, shown in the detail of FIG. 12B, which can be implemented for example by means of a localized growth of the section of the rod 6 itself. Therefore, the disk 19 is free for translating exclusively along the portion of driving rod 6 comprised between a final end of the rod 6, located near the driving handle 24, and the stopper element 20.

At the bottom 9, there are one or more magnets 21, arranged to exert an attractive force onto the mobile element 19.

This embodiment of the jet device 120 can be associated to a particular embodiment of the previously described supporting/reservoir device, having additionally a raising element 22, which can be implemented for example by means of a projection, arranged to engage on said mobile element 19 in a configuration for housing the jet device 120 in the supporting device 12, as shown in FIG. 13.

The filling mode implemented by means of this last embodiment of the hydro-cleaning system 1000 according to the present invention is described hereinafter in the description.

Starting from a configuration of the jet device 120 immediately subsequent to a concluded spraying phase, the piston 5 is in a position of maximum penetration in the cylindrical body 3.

The disk 19 is in contact with the magnets 21 existing on the bottom 9, which exert thereon an attractive force, by keeping it in this position. Therefore, thanks to the presence of the stopper element 20 preventing the disk 19 from sliding with respect to the driving rod 6 according to a direction of approaching to said magnets 21, the latter are configured to keep in the position of maximum penetration the whole piston 5, by overcoming the elastic contrast force of the return spring 13. In said position of maximum penetration, the plunger 7 preferably abuts on a rear terminal end of the nozzle 4. When the jet device 120 is housed in the supporting device 12, the raising element 22 engages on the disk 19 and it causes mechanically the detachment thereof from the magnets 21, by leaving free the piston 5 to come back in the position of maximum extraction from the cylindrical body 3, pushed by the return force of the spring 13. This automatic motion of the piston 5 causes the opening of the second unidirectional valve 14 and it causes the filling-in of the jet device 120, according to the previously described mode.

Now a more compact variant of the just described supporting device 12, included in an optimized embodiment of the hydro-cleaning system 1001, will be described. Such supporting device 25 according to the proposed variant is shown in FIGS. 14 and 15.

The supporting device 25 comprises the first chamber C and the second chamber D having the common bottom, being communicating at said common bottom by a passage apt to guarantee the passage of the liquid from the first chamber C to the second chamber D. The latter second chamber D has an opening opposite to said common bottom and said first space C has a closing element opposite to said common bottom. Said first space C, preferably at said closing element, comprises the fourth unidirectional valve 17, oriented so as to make the air to outgo from inside of said supporting device 25 towards outside. In this embodiment, the second chamber D implements a housing for said jet device 120, preferably arranged to keep such device in preferably vertical position, as shown in FIG. 16.

Even said supporting device 25 has the raising element 22, which preferably can be implemented by means of a particular morphology of the same second chamber D. In particular, the second chamber D can have a first distal end projecting with respect to the supporting device 25, opposite to a second distal end placed near the bottom of the supporting device 25. Said first distal end can be arranged to engage on a portion of said mobile element 19 in a configuration for housing the jet device 120 in the supporting device 25, as shown in FIG. 17.

Such arrangement for example can be a shape of the first distal end of the second chamber D so as to implement a projection intercepting only a portion of the mobile element 19 when the latter comes to abut on the second chamber D itself, by determining the detachment of the disk 19 from the magnets 21. The piston 5 then is free for translating towards the position of maximum extraction with respect to the cylindrical body 3, by implementing a mode for reloading the jet device 120 similar to the one described previously for the hydro-cleaning system 1000, as shown in FIG. 18.

Figure 19:
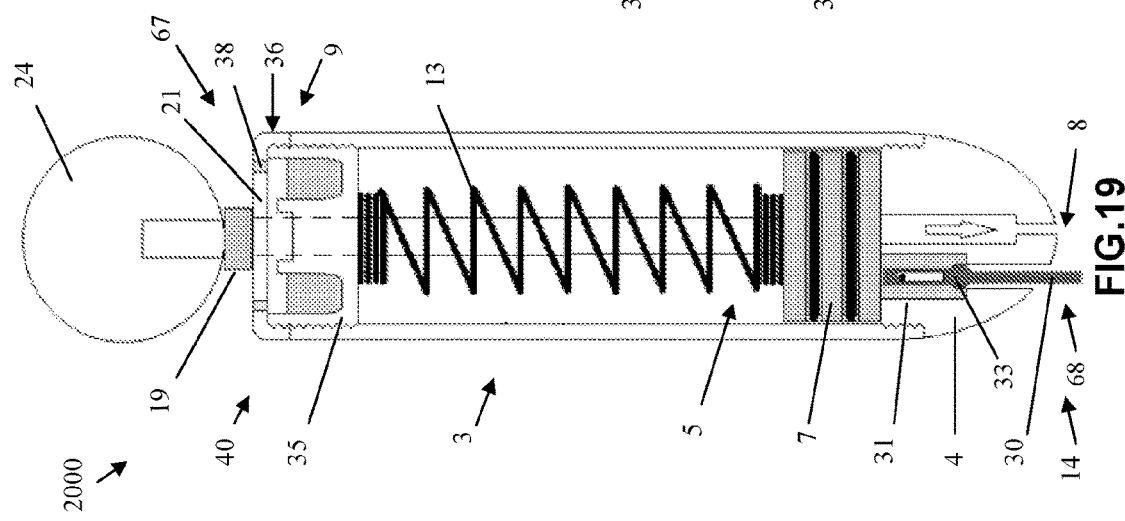
FIG. 19 shows a longitudinal section view of an additional preferred embodiment of the invention.

By referring to FIG. 19, an alternative embodiment of the jet device of the invention is designated as a whole with 2000, and the corresponding system is designated with 2001. Hereinafter only the elements will be described which result to be different from the already illustrated embodiments, whereas the common elements will be meant to have structural and functional features according to what said previously.

The configuration of the jet device 2000 is so that the return elastic member 13 is stressed under traction during the ejection phase of the cleaning jet. As shown in FIG. 19 and as visible in the additional FIGS. 24 to 27, the return elastic member 13 preferably is implemented by means of a helical spring.

Figure 23:
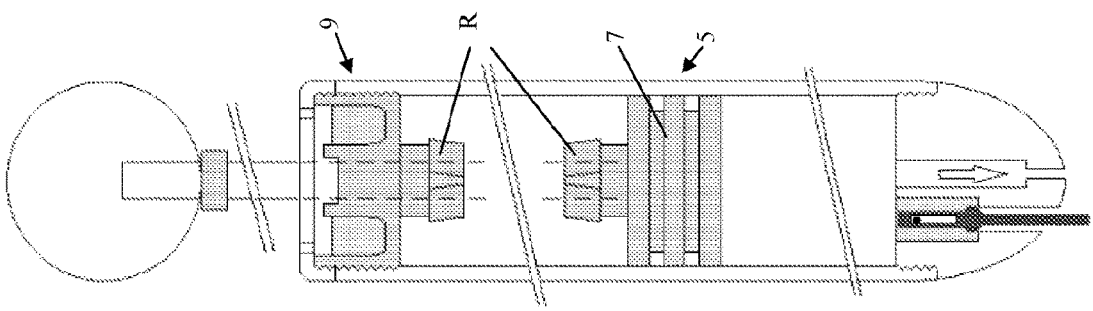
FIG. 23 shows a longitudinal section view of the device of FIG. 19, wherein the contrast element is not represented.

According to this embodiment, as shown by way of example in FIG. 23, the spring 13 is engaged at the terminal ends thereof on the piston 5 and on the bottom 9, respectively (or on a perfume reservoir member which will be described hereinafter, if present) at suitably shaped respective portions R, shown by way of example in FIG. 23. The spring 13 is apt to draw the piston 5 back in a position of maximum distance from said first terminal end when it is in a rest condition. Upon use, when a force is applied to the driving handle 24 of the piston 5 so as to deform the spring 13, this lengthens, by allowing the sliding of the piston 5 towards the nozzle 4 and the contemporary outgoing of the fluid from the unidirectional valve 8 of the nozzle 4, according to the already described modes.

In the embodiment 2000, the magnetic locking system 67 is implemented by means of one or more magnets 21 positioned at the bottom 9 and an attraction member 19, positioned on the rod, at the driving handle 24. The filling-in of the cylinder 3 with the fluid is implemented by means of the second unidirectional valve 14 according to the previously described mode. Furthermore, thanks to the presence of a different embodiment of the releasing system 68, the coupling of the jet device to a supporting/reservoir device suitably shaped to implement the detachment between the 21 and the attraction member 19 is not requested. Therefore, advantageously, the jet device can be used together with any supporting/reservoir device, however by keeping unaltered the functionality thereof.

The releasing system 68 of the jet device 2000 is implemented directly by means of the second unidirectional valve 14, the rod thereof 30 bears a spherical portion 33, visible in FIG. 19, implementing the function of unidirectional valve. The rod 30 is placed in a corresponding seat 31, preferably comprised or implemented in the nozzle 4. The seat 31 crosses the nozzle for all the extension thereof and it can have a development direction substantially parallel to the longitudinal development axis L of the cylindrical body 3. The seat 31 extends as far as rear terminal portion of the nozzle 4, thereon the plunger 7 abuts when the piston 5 is in a configuration of maximum penetration, for example subsequent to a fluid spraying phase. The piston 5 is kept in the position of maximum penetration thanks to the action of magnetic attraction between the two magnets 21, overcoming the elastic reaction force of the spring 13, in position of maximum extension.

Furthermore, the seat 31 is configured to allow the sliding of the rod 30 and it has a lower length than the rod 30, which then always projects with respect thereto, towards inside or outside the cylinder 3. Furthermore, the seat 31 has stopper elements configured to engage on the spherical portion 33 of the rod 30 to implement the occlusion of the liquid passage. The valve 14 implementing the releasing system 68 usually is closed. As said before, the seat 31 and the rod 30 are configured to implement the non-return valve 14, which can allow the fluid passage exclusively from outside towards the inner cavity of the cylinder, and it prevents it from outgoing. Advantageously, the set of seat 31 and rod 30 allows to reload the cylinder with the fluid, according to the modes explained hereinafter.

By referring to the sequence of FIGS. 24-27, a preferred mode for reloading the jet device 2000 according to the present embodiment will be now described.

Figure 27:
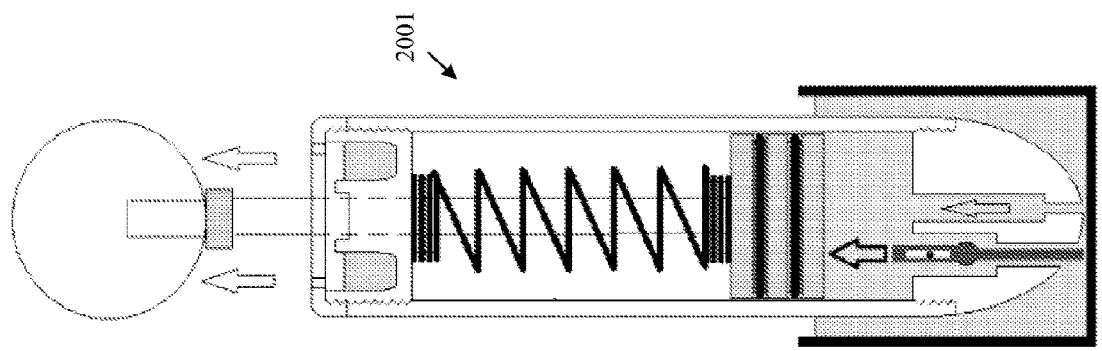
FIGS. 24 to 27 show a longitudinal section view of the device of FIG. 19, respectively, each one corresponding to a phase of a sequence for using said device.
Figure 26:
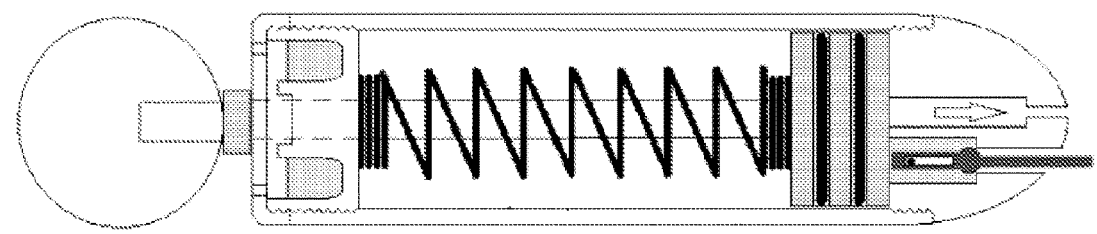
Figure 25:
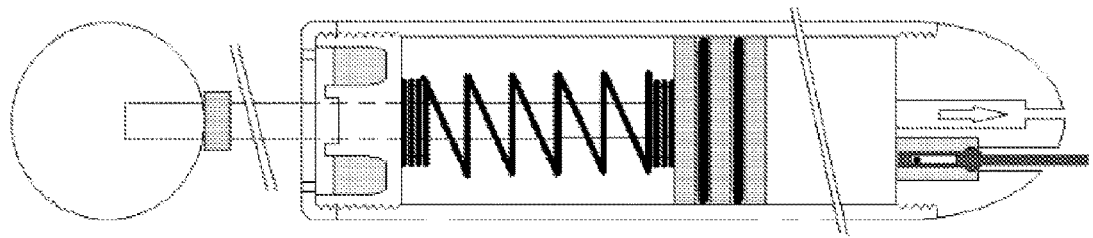
Figure 24:
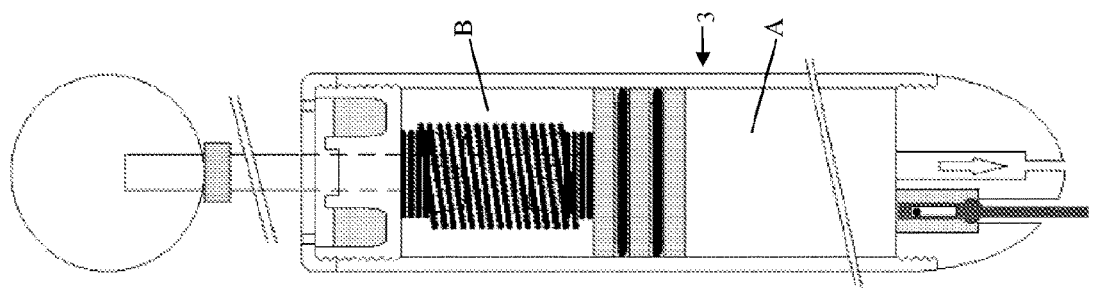

When the plunger 7 is in a position of maximum penetration, abutted on the nozzle 4, the rod 30 projects from the nozzle 4 at the front terminal end, and the spherical portion thereof abuts on the stopper elements of the seat 31, to prevent the fluid passage. In order to reload the cylinder 3 with the sanitizing fluid, it is sufficient to apply a push to the projecting end of the rod 30. For example, such push can be due to the positioning of the jet device 2000 in a reservoir, and to the contact of the rod 30 with the bottom of the reservoir itself. The rod 30, under the action of such push, slides in the seat 31 towards the rear terminal end of the nozzle 4, and comes in contact with the plunger 7. By continuing to push the element 30, this will apply a corresponding force on the plunger, locked in the position of maximum penetration by the coupling of the two magnets 21. When the force applied on the plunger 7 exceeds the mutual attractive force between the two magnets 21, they detach and do not stop the return elastic member 13 anymore, which can return in the rest configuration. Consequently, the elastic element shortens by returning towards the second terminal end of the cylinder, and it drags in the motion thereof the plunger 7. The sliding, or better the moving-back, of the plunger 7 with respect to the nozzle 4 allows the sliding of the rod 30 and the opening of the passage for the inlet of the fluid in the hollow cylindrical body 3, through the seat 31 of the rod 30 (FIG. 27).

The hydro-cleaning system comprising the jet device 2000 shown in the FIGS. 19 to 22 can further have, additionally with respect to the already described variants, a perfume supplying device 40. In the embodiment shown in the above mentioned figures, the perfume supplying device 40 is included in the bottom 9. Moreover, the perfume supplying device is apt to implement a seat for the sliding of the rod 6. Such device 40 comprises a perfume reservoir member 35 and one or more small holes or openings 38 to spread the perfume outside the device 40. The perfume reservoir element 35, apart from the hole or passage seat for the rod 6 of the piston 5, has one or more seats 37 for containing the perfume. Preferably, the perfume reservoir element 35 has a seat 37 shaped like a circular crown around said passage seat for the rod 6, open at an end opposite to the one engaging with the spring 13. The seat 37 can be filled-in with substances for perfuming air, preferably perfumes in the liquid form or elements made of absorbing material soaked in perfumed substances. The holes 38 are suitably sized to not allow accidental outgoing of the perfumed substances in liquid form, therefore the diameter thereof is sufficiently reduced to allow the outgoing exclusively of vaporized liquid particles. The perfume supplying device 40 can also include a closing element 36, faced towards the seat 37 of the perfume reservoir element 35 and configured to engage thereon, for example by means of a threaded connection. In this embodiment, the holes 38 are implemented on the closing element 36. The set of the perfume reservoir element 35 and the closing element 36 limits a perfuming chamber P, shown in FIG. 21. The air inside the chamber P is full of perfume, considering that the exchange of air with outside is almost null under static conditions, due to the very reduced diameter of the holes 38.

As said, the holes 38 are apt to allow the perfume outgoing, in particular during the fluid loading phase. In fact, during the phase for inserting the sanitizing fluid through the valve 14, the piston 5 translates towards the second terminal end of the hollow cylindrical body 3. The motion of the piston and of the plunger associated thereto is allowed only if the air existing in the chamber B outgoes from the cylinder 3. To this purpose, the seat for the sliding of the rod 6 implemented by the perfume supplying device 40 has a shape so as to allow the air passage during the sliding of the rod itself. The air outgoing from the chamber B, passing in the meatus between the rod 6 and the respective passage seat, enters the perfuming chamber P and comes out through the holes 38, due to the pressure difference between the chamber B and outside. During the outgoing motion thereof, the air of the chamber B drags even the full-of-perfume air included inside the perfuming chamber P outside the jet device 2000.

Use indications: for a correct use of the device, it is advisable to grasp with one hand the grip member 23, to orient correctly the jet device, whereas with the other hand one can give the push on driving handle 24 of the piston 5, to obtain the outgoing of the cleaning jet. The greater is the push exerted on the driving handle 24, the greater is the jet pressure. At last, it is to be noted that all embodiments of the jet device according to the present invention are suitable to be used comfortably by right-hand and left-hand users.

The present invention has been sofar described with reference to preferred embodiments. It is to be meant that other embodiments belonging to the same inventive core may exist, as defined by the protective scope of the herebelow reported claims.

The invention claimed is:

1. A hydro-cleaning system in particular apt to the cleaning of a WC, comprising a jet device comprising:
a hollow cylindrical body, configured to contain a liquid;
a nozzle, removably connected or connectable to a first terminal end of hollow cylindrical body;
a piston, associated with the hollow cylindrical body, comprising a driving rod, configured to slide according to a translation movement, integral to a plunger, said plunger being movable in an approaching or distancing translational movement from the first terminal end of the hollow cylindrical body, wherein the approaching movement causes a liquid emission phase from said nozzle, and wherein a first chamber and a second chamber of the hollow cylindrical body, is defined by the plunger and the first terminal end of the hollow cylindrical body and a second terminal end thereof, respectively;
a first unidirectional valve, removably connected or connectable to said nozzle and oriented so as to allow the emission of the liquid from the hollow cylindrical body and to prevent the inlet of the liquid into the hollow cylindrical body;
a bottom removably connected or connectable to the hollow cylindrical body at the second terminal end of the hollow cylindrical body, having a hole with guiding members, configured to allow a sliding of the driving rod;
a return elastic member configured to withdraw the piston to a position of maximum distance from the first terminal end;
a reversible locking mechanism of the piston with respect to said hollow cylindrical body, comprising a magnetic locking system; and
a releasing system for the reversible locking mechanism, wherein the magnetic locking system comprises one or more magnets placed near the bottom, and a corresponding attraction member positioned at a first end of the rod opposite to the plunger configured to be attracted by the one or more magnets.

2. The system according to claim 1, wherein the driving rod comprises a driving handle for the manual operation of the jet device.

3. The system according to claim 1, wherein the return elastic member is a helical spring.

4. The system according to claim 1, wherein the return elastic member is arranged so as to work under traction.

5. The system according to claim 1, wherein the return elastic member is arranged so as to work under compression.

6. The system according to claim 1, wherein the jet device further comprises a second unidirectional valve, removably connected or connectable to the hollow cylindrical body at the first terminal end, oriented so as to allow the inlet of the liquid in the first chamber.

7. The system according to claim 6, wherein said releasing system comprises a rod of the unidirectional valve, said rod being configured to exert a push on said plunger to cause a translation of the piston towards the second terminal end of the hollow cylindrical body when the valve is actuated during opening.

8. The system according to claim 1, wherein the bottom comprises a perfume supplying device, wherein the perfume supplying device comprises a perfume reservoir member having one or more holes, the perfume reservoir member being having a seat for the sliding of said rod, shaped so as to allow air passage during the sliding of said rod from the second chamber to the perfume supplying device, so that air is capable of crossing the perfume supplying device and passing through the one or more holes.

9. The system according to claim 1, comprising a supporting device of the jet device.

10. The system according to claim 9, wherein the supporting device comprises a portion configured for housing the first terminal end.

11. The system according to claim 9, wherein the supporting device comprises a reservoir configured to store a liquid.

12. The system according to claim 11, wherein the reservoir comprises a first space and a second space having a common bottom, and communicating at the common bottom by a passage, said second space having an opening opposite to the common bottom and said first space having a closure element opposite to the common bottom.

13. The system according to claim 12, wherein the first space comprises a fourth unidirectional valve, oriented so as to allow air to come out from the first space towards outside.

14. The system according to claim 12, wherein the first space comprises a filling opening having a third unidirectional valve for an inlet of said liquid into the reservoir.

15. The system according to claim 14, wherein the reservoir comprises a tubular element installed inside the first space, at the filling opening, the tubular element extending from the filling opening near the common bottom of the reservoir.

16. The system according to claim 9, wherein the releasing system comprises a raising element provided on the supporting device, the raising element being arranged to engage on the mobile element when the jet device is housed in the supporting device.

* * * * *